(12) United States Patent
Snyder et al.

(10) Patent No.: US 9,713,843 B2
(45) Date of Patent: Jul. 25, 2017

(54) METHOD FOR ADDITIVELY CONSTRUCTING INTERNAL CHANNELS (71) Applicant: United Technologies Corporation, Farmington, CT (US)

(72) Inventors: Brooks E. Snyder, Dartmouth (CA); Thomas N. Slavens, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/111,421

(22) PCT Filed: Jan. 14, 2015

(86) PCT No.: PCT/US2015/011293
§ 371 (c)(1),
(2) Date: Jul. 13, 2016

(87) PCT Pub. No.: WO2015/112384
PCT Pub. Date: Jul. 30, 2015

(65) Prior Publication Data
US 2016/0332229 A1 Nov. 17, 2016

Related U.S. Application Data (60) Provisional application No. 61/930,103, filed on Jan. 22, 2014.

(51) Int. Cl.
B22F 3/105 (2006.01)
B22F 5/04 (2006.01)
F01D 25/12 (2006.01)
B33Y 10/00 (2015.01)
B33Y 80/00 (2015.01)
B22F 5/00 (2006.01)
B23K 15/00 (2006.01)
F01D 5/18 (2006.01)
(Continued)

(52) U.S. Cl.
CPC ............ *B22F 3/1055* (2013.01); *B22F 5/009* (2013.01); *B22F 5/04* (2013.01); *B23K 15/0086* (2013.01);
(Continued)

(58) Field of Classification Search
CPC .............................. B22F 3/1055; B33Y 10/00
(Continued)

(56) References Cited

U.S. PATENT DOCUMENTS 6,391,251 B1    5/2002   Keicher et al.
7,306,424 B2   12/2007   Romanov et al.
(Continued)

FOREIGN PATENT DOCUMENTS

DE    102012008371 A1   10/2013
EP         2685170 A1    1/2014
(Continued)

OTHER PUBLICATIONS

International Search Report and Written Opinion from PCT Application Serial No. PCT/US2015/011293, dated Apr. 28, 2015, 10 pages.
(Continued)

*Primary Examiner* — Weiping Zhu
(74) *Attorney, Agent, or Firm* — Kinney & Lange, P.A.

(57) ABSTRACT

A method of additively manufacturing is used to produce a component with an internal cooling channel for conveying a fluid. Powders in a powder bed are selectively fused to form a shaped layer of a body of the cooled component. The fusing is repeated on a layer-by-layer basis to form the body of the component with the internal cooling channel extending within the body, so that a peripheral wall of the internal cooling channel has a geometry that allows the peripheral wall to be self-supporting.

15 Claims, 9 Drawing Sheets (51) Int. Cl.
*F01D 9/02* (2006.01)
*F01D 11/08* (2006.01)
*B23K 101/00* (2006.01)

(52) U.S. Cl.
CPC ............... *B33Y 10/00* (2014.12); *B33Y 80/00* (2014.12); *F01D 5/18* (2013.01); *F01D 9/02* (2013.01); *F01D 11/08* (2013.01); *F01D 25/12* (2013.01); *B22F 2998/10* (2013.01); *B23K 2201/001* (2013.01); *F05D 2220/30* (2013.01); *F05D 2230/22* (2013.01); *F05D 2230/31* (2013.01); *F05D 2240/11* (2013.01); *F05D 2260/204* (2013.01); *F05D 2300/10* (2013.01); *Y02P 10/295* (2015.11)

(58) Field of Classification Search
USPC .......................................................... 419/52
See application file for complete search history.

(56) References Cited

U.S. PATENT DOCUMENTS

| | | |
|---|---|---|
| 7,854,120 B2 | 12/2010 | Olver |
| 8,240,981 B2 | 8/2012 | Spangler et al. |
| 8,336,313 B2 | 12/2012 | McMasters et al. |
| 2009/0255256 A1 | 10/2009 | McMasters et al. |
| 2009/0256003 A1 | 10/2009 | McMasters et al. |
| 2013/0101746 A1 | 4/2013 | Keremes et al. |
| 2013/0328975 A1 | 12/2013 | Redding et al. |
| 2013/0337256 A1 | 12/2013 | Farmer et al. |
| 2014/0305529 A1* | 10/2014 | Kroll .................. B29C 67/0077 138/111 |

FOREIGN PATENT DOCUMENTS

| | | |
|---|---|---|
| EP | 2728119 A1 | 5/2014 |
| WO | WO2013/017647 A1 | 2/2013 |

OTHER PUBLICATIONS

R.K. Shah et al., "The Manufacture of Micro Cross-Flow Heat Exchangers by Selective Laser Melting," Proceedings of Fifth International Conference on Enhanced, Sep. 1, 2005, pp. 2005-2053.

Extended European Search Report for EP Application No. 15741105.9, Dated Jan. 5, 2017, 10 Pages.

* cited by examiner

METHOD FOR ADDITIVELY CONSTRUCTING INTERNAL CHANNELS

BACKGROUND

The present embodiments relate to gas turbine engines and, more particularly, to cooling channels used in actively cooled gas turbine engine components.

Modern gas turbine engines increasingly operate under higher temperatures to achieve improved overall engine performance. However, the temperatures at the turbine inlet and along the gas path within the turbine generally exceed the melting point of the materials from which the exposed turbine components are made. As a result, turbine gas path components must be actively cooled to prevent failure.

One conventional means of cooling turbine gas path components involves the use of internal component channels, which pass cooling air, extracted for example from the compressor, to the turbine gas path component. This cooling air is typically hundreds of degrees to even a thousand degrees colder than the gas path. For instance, a turbine blade outer air seal can be made to contain internal channels running circumferentially in the engine through which cooling air is passed. The effectiveness of the channels ultimately dictates the temperature of the gas path component, and therefore, its ability to withstand modern gas turbine engine operating temperatures. Channel effectiveness can be increased by shrinking channel volume, and thus increasing flow speeds through the channel. Yet, the ability to shrink channel volume is limited due to the process capabilities of traditional manufacturing castings.

Additive manufacturing techniques can be utilized to overcome the limitations inherent in traditional manufacturing and increase the design space of cooled components. Additively manufactured parts are typically made by fusing successive powder layers to form the component. However, when an internal channel with an overhanging structure is additively built, the overhanging structure tends to collapse as additional layers of the component are built on top of the overhanging structure. Channel collapsing reduces the channel's cooling performance and can render the channel useless. To prevent channel collapsing, support material, such as loosely fused powder, has been used inside the channel. The use of support material inside a channel is problematic for microchannels where there generally is no access for cleaning the support material out from the microchannel after the build, leaving support material trapped inside the microchannel. This then also renders the channel useless.

SUMMARY

One embodiment includes a method of additively manufacturing a component with an internal cooling channel for conveying a fluid. Powders in a powder bed are selectively fused to form a shaped layer of a body of the cooled component. The fusing is repeated on a layer-by-layer basis to form the body of the component with the internal cooling channel extending within the body, so that a peripheral wall of the internal cooling channel has a geometry that allows the peripheral wall to be self-supporting.

Another embodiment includes a method to additively manufacture a component that utilizes a microchannel within the component to convey a fluid internally. Powders in a powder bed are selectively fused to form an initial shaped layer of a body of the component. The fusing is repeated on a layer-by-layer basis to form the body of the component with the microchannel extending within the body. The microchannel includes an eccentric convexity geometry such that the microchannel can self-support subsequent layers fused on top of the microchannel.

DETAILED DESCRIPTION

Generally, an actively cooled component can be additively manufactured to contain an internal channel that is self-supporting, so that the internal channel will not collapse when additional component layers are built on top of overhanging portions of the internal channel. A portion of the channel peripheral wall, and thus the channel geometry itself, is formed to be of an eccentric convexity geometry. Eccentric convexity geometry refers to the shape of a top portion of the channel, relative to the additive build direction, where each subsequently formed layer is offset and projects out from the immediately preceding layer, resulting in a convex peripheral wall, relative to the interior of the channel, at the top portion of the channel. The eccentric convexity geometry allows the channel peripheral wall formed by each subsequent layer to be buttressed by the channel peripheral wall formed by each immediately preceding layer. Therefore, although no support material is used inside the channel, the channel can have additional component layers built on top of an overhanging portion of the channel without collapsing.

By not using support material, such as loosely fused powder, inside the channel, support material no longer stays trapped inside microchannels where the small channel size makes it extremely difficult or impossible to clean all support material out from inside the channel after the additive build. Therefore, the cooling air flowing through the channel will not be blocked and the component can be actively cooled as efficiently as designed. Although embodiments are discussed herein with reference to a turbine blade outer air seal (BOAS or turbine shroud), they apply to additively manufacturing any other type of actively cooled component that utilizes internal channels to convey a cooling fluid, including turbine blades and vanes.

Figure 1:
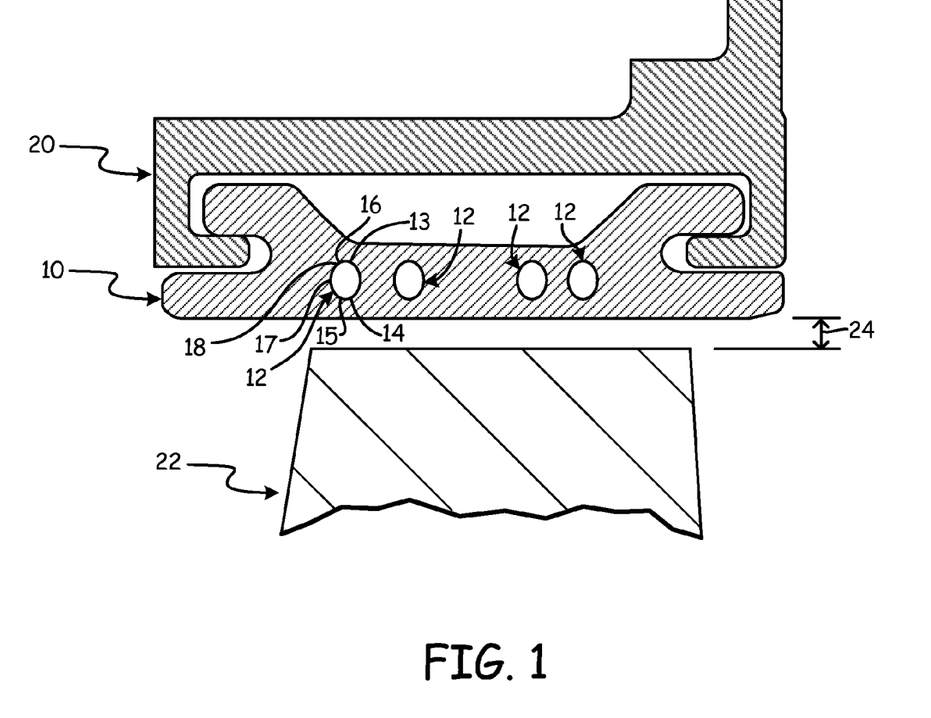
FIG. 1 shows a cross-sectional view of a turbine blade outer air seal.

FIG. 1 shows a cross-sectional view of BOAS 10 in a gas turbine engine. BOAS 10 contains internal channels 12 defined by peripheral walls 14, which include top 13, bottom 15, and sides 17 of internal channel 12, as well as locations 16 and 18. Internal channels 12 are microchannels. A microchannel generally has a largest cross-sectional area of approximately 0.0025 in.$^2$ (1.6129 mm$^2$), with a maximum cross-sectional radial width under approximately 0.080 in.

(2.032 mm) A channel larger than this is a normal cooling flow channel. BOAS 10 is supported in place by BOAS hanger 20. Also shown is turbine blade 22, an airfoil, the tip of which is spaced apart from BOAS 10 at a desired clearance 24.

Hot combustion gas flow is directed toward turbine blade 22, which transforms the hot combustion gas flow into mechanical energy. Clearance 24 is sized to minimize gas flow between turbine blade 22 and BOAS 10, as gas that flows through clearance 24 is not transformed into mechanical energy, and thus reduces engine efficiency. BOAS 10 is exposed to the hot combustion gas flow and requires cooling. Cooling airflow fluid is passed through internal channels 12 to control the temperature of BOAS 10.

As will be further illustrated for FIGS. 2a-2e, top portion 13 of internal channel 12 utilizes eccentric convexity geometry, relative to clearance 24. This results in peripheral wall 14 at location 16 being buttressed by peripheral wall 14 at location 18. Thus, the eccentric convexity geometry of top portion 13 allows for continual buttressing of subsequent peripheral wall 14 layers by immediately preceding peripheral wall 14 layers. The buttressing enables the loads applied on peripheral wall 14, by subsequently built layers on top of top portion 13, to be transferred. In turn, peripheral wall 14, and therefore internal channel 12, can support additional BOAS 10 layers fused or built on top of overhanging portions of internal channel 12 without collapsing.

In the embodiment shown in FIG. 1, the self-supporting, eccentric convexity geometry of internal channel 12, defined by peripheral wall 14, constitutes a rounded profile at top 13. Bottom 15 also contains a rounded profile. A rounded profile results from curvature in peripheral wall 14. However, internal channel 12 in FIG. 1, although rounded, is not a perfect circle, but rather is shaped as an ellipse or oval. A perfect circle, which has a constant radius to all points of the perfect circle, would have a magnitude of curvature too large at top 13 to provide the necessary buttressing to be self-supporting. An ellipse or oval, with a lesser magnitude of curvature at top portion 13 and nonconstant radius, allows continual buttressing of subsequent peripheral wall 14 layers by immediately preceding peripheral wall 14 layers.

FIGS. 2a-2e schematically illustrate a method for producing BOAS 10 of FIG. 1. BOAS 10 is made by an additive manufacturing (or rapid manufacturing) process. Such processes include Direct Metal Laser Sintering (DMLS), Electron Beam Melting (EBM), and other known processes in the manufacturing. An additive manufacturing process typically utilizes a heat source, such as a laser or electron beam, to fuse powder particles in a two-dimensional powder bed to form a layer of the component being built. The fusing is then repeated to form an additional layer of the component, until ultimately the component is built up layer-by-layer and completed.

Figure 2A:
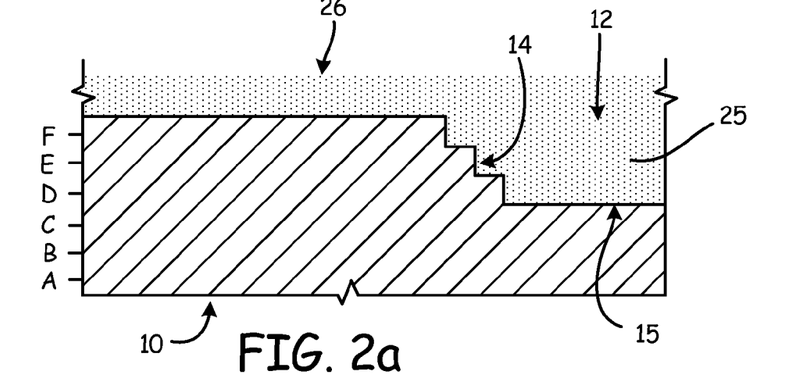
FIGS. 2a-2e schematically illustrate an additive manufacturing method for producing the turbine blade outer air seal of FIG. 1.

FIG. 2a shows a close-up front elevational view of a portion of BOAS 10 being additively built. Included are internal channel 12, peripheral wall 14 of internal channel 12, bottom 15 of internal channel 12, nonfused powders 25, powder bed 26, and fused layers A, B, C, D, E, and F. Layer thickness ranges from approximately 0.001-0.005 inch (0.025-0.127 millimeter) and powder size ranges from approximately 0.0016-0.0047 inch (0.04-0.12 millimeter).

As shown in FIG. 2a, BOAS 10 is built by fusing powders 25 in powder bed 26 to form single layer A of BOAS 10. The fusing transforms powders 25 at this location into solid layer A of BOAS 10. The fusing is then repeated on a layer-by-layer basis to form all remaining layers, including B and C, of BOAS 10. At the location in BOAS 10 where internal channel 12 is to be located, the fusing of powders 25 differs slightly. When building layer D, the fusing is terminated for a portion of layer D such that loose powders 25 are left in the location where bottom 15 of internal channel 12 is to be located. The point at which the fusing is terminated for a portion of layer D forms peripheral wall 14 of internal channel 12. Internal channel 12 is shaped as an ellipse or oval, so successive layers at bottom 15, including E and F, are fused such that peripheral wall 14 curves outward from bottom 15—the fusing for layer E is terminated at a location short of where the fusing for layer D is terminated, and the fusing for layer F is terminated at a location short of where the fusing for layer E is terminated.

Figure 2B:
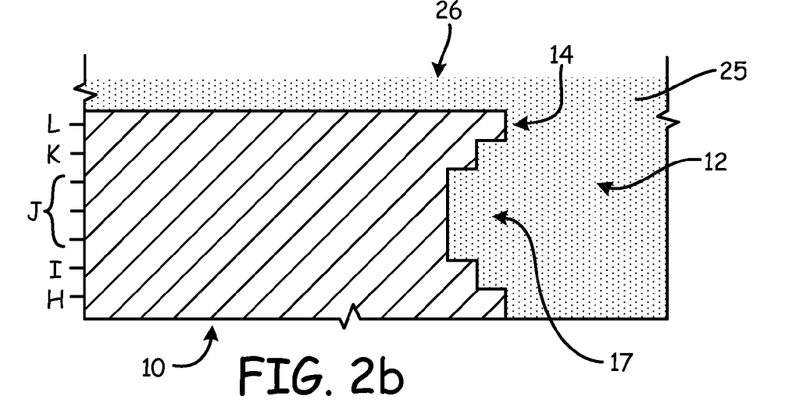

FIG. 2b shows BOAS 10 further built up layer-by-layer such that the fusing is now taking place at side 17 of internal channel 12. Side 17 of oval or ellipse internal channel 12 is where peripheral wall 14 transitions from curving outward from bottom 15 to curving inward. Layers H and I are fused in the same manner as that for layers D, E, and F of FIG. 2a. Multiple layers J constitute the transition point where peripheral wall 14 transitions from curving outward to curving inward, and thus where the eccentric convexity begins. Therefore, beginning at layer K, and continuing with each subsequent layer including layer L, peripheral wall 14 is formed so that internal channel 12 has eccentric convexity geometry at top portion 13 of internal channel 12.

Figure 2C:
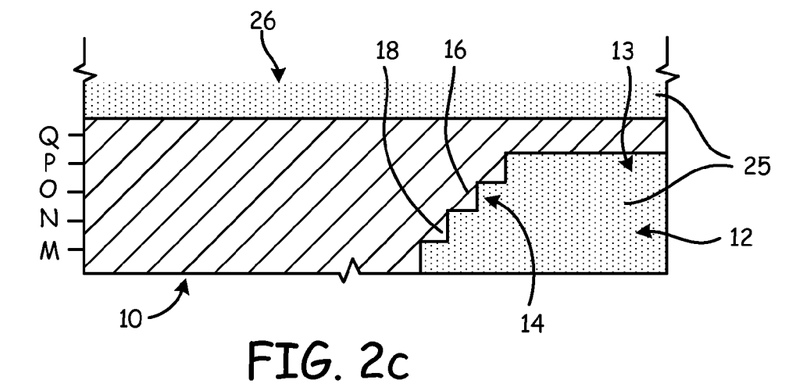

FIG. 2c shows BOAS 10 further built up layer-by-layer such that the fusing has now taken place at top 13 of internal channel 12. The eccentric convexity geometry of internal channel 12 continues from side 17 to top 13 as shown by layers M, N, O, P, and overhanging layer Q. The eccentric convexity geometry allows peripheral wall 14, and thus internal channel 12, to be self-supporting. This is because the eccentric convexity geometry results in each subsequently formed layer being supported or buttressed by the immediately preceding layer without the use of any support material inside internal channel 12. For example, subsequent layer O has an overhang 16 which is buttressed by immediately preceding layer N at location 18. The distance overhang 16 of layer O extends out from layer N at location 18 is the rate of buttressing. The rate of buttressing is a function of the maximum width of bottom 15 of internal channel 12. For example, when the width of bottom 15 of internal channel 12 is greater, a lower rate of buttressing must be used—the overhang of each layer must extend out less. On the other hand, when the width of bottom 15 of internal channel 12 is smaller, a greater rate of buttressing can be used—the overhang of each layer may extend out further.

Figure 2D:
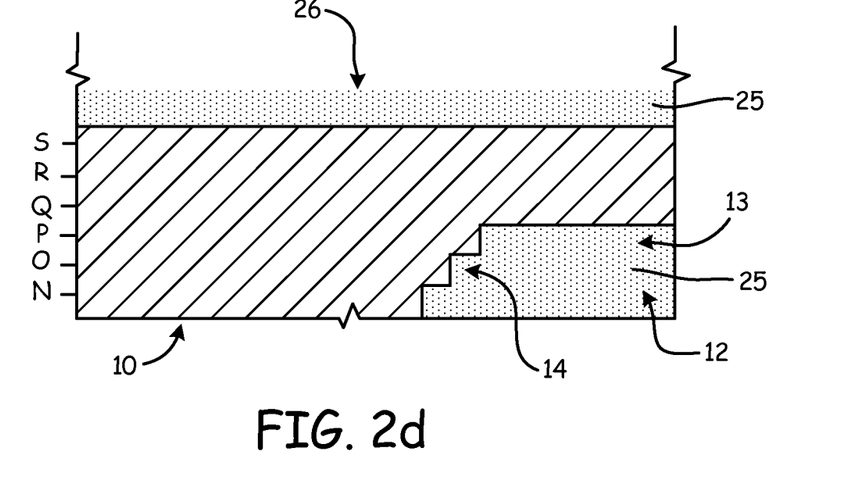

As shown for FIG. 2d, in this same manner overhanging layer Q is buttressed by immediately preceding layer P. The buttressing resulting from the eccentric convexity geometry for top portion 13 of internal channel 12 prevents peripheral wall 14, and thus internal channel 12, from collapsing when additional layers R and S are built on top of overhanging layer Q. Without the buttressing from the eccentric convexity geometry, overhanging layer Q would develop an unsupported roof syndrome when additional layers are built on top of it and collapse.

Figure 2E:
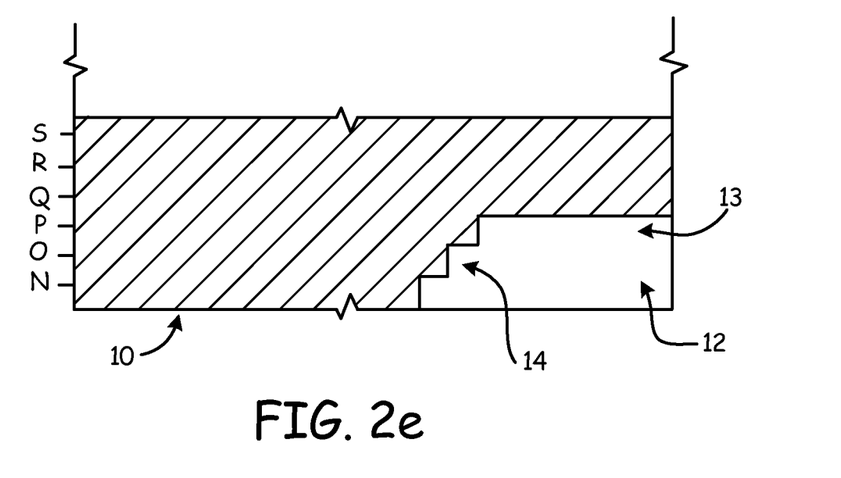

As illustrated in FIG. 2e, the layer-by-layer build has been completed. BOAS 10 has been removed from powder bed 26 and nonfused powders 25 present in previous FIGS. 2a-2d within internal channel 12 during the layer-by-layer build have been removed. The powders 25 provide no support for internal channel 12 during the build, which is why internal channel 12 maintains its geometry when powders 25 are removed. Rather, the support for overhanging layer Q of internal channel 12 is provided by the buttressing resulting from the eccentric convexity geometry, as previously described.

Figure 3:
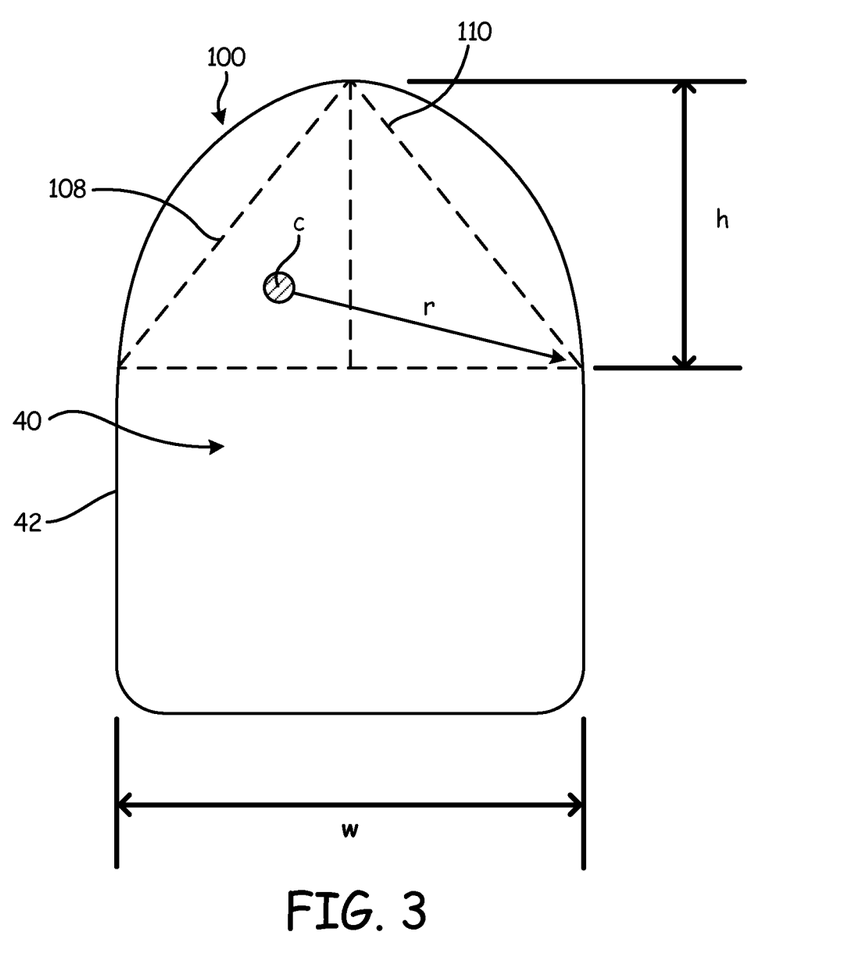
FIG. 3 illustrates dimensions of a microchannel.

FIG. 3 shows a cross-section of internal channel 40, a microchannel, with peripheral wall 42. Here, the eccentric convexity geometry at the top portion of internal channel 40 results in a rounded profile, arch 100. Also shown are arch height h, internal channel 40 width w, radius of the arch r, and drawn in for purposes of showing the dimension of radius of the arch r are opposing triangles 108 and 110. Radius of the arch r as presently shown is measured from the centroid c of triangle 108 to provide radius of the arch r for the right half of arch 100. Radius of the arch r for the left half of arch 100 would be measured from the centroid of triangle 110. Internal channel 40 is dimensioned such that arch height h=width w/layer thickness. As discussed previously, layer thickness ranges from approximately 0.001-0.005 inch (0.025-0.127 millimeter). Internal channel 40 is also dimensioned such that radius of the arch $r_{min}=(1/4)$*width w and radius of the arch $r_{max}=(3/4)$*width w. In embodiments where the top of internal channel 40 constitutes a squeezed profile, or triangle, rather than the arch 100 shown here, radius of the arch r instead measures the radius of the circumscribed arch.

Figure 4A:
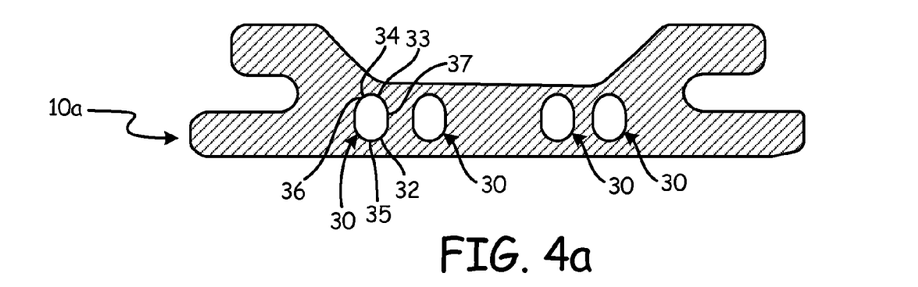
FIGS. 4a-4d show cross-sectional views of alternative embodiments of the turbine blade outer air seal of FIG. 1 with different cooling microchannel configurations.

FIGS. 4a-4d illustrate cross-sectional views of alternative embodiments of BOAS 10 of FIG. 1 with different cooling microchannel configurations. FIG. 4a shows a cross-sectional view of BOAS 10a. Internal channel 30 with peripheral wall 32 is a microchannel of eccentric convexity geometry at top portion 33. Peripheral wall 32, and thus internal channel 30, is of a self-supporting, eccentric convexity geometry as peripheral wall 32 at location 34 is buttressed by peripheral wall 32 at location 36 in the same manner as that described for FIGS. 2a-2e. Here, the self-supporting geometry of internal channel 30, defined by peripheral wall 32, also constitutes a rounded profile for top portion 33 of internal channel 30 (as was the case for internal channel 12 of FIG. 1), but between top portion 33 and bottom portion 35 are linear, non-rounded sides 37.

Figure 4B:
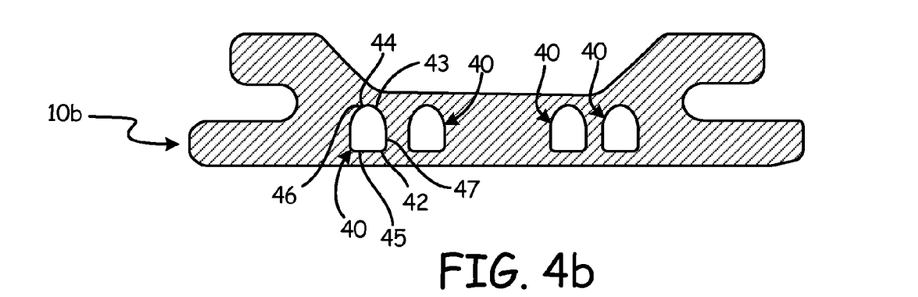

FIG. 4b shows a cross-sectional view of BOAS 10b. Internal channel 40 with peripheral wall 42 is a microchannel of eccentric convexity geometry at top portion 43. Peripheral wall 42, and thus internal channel 40, is of a self-supporting, eccentric convexity geometry as peripheral wall 42 at location 44 is buttressed by peripheral wall 42 at location 46. Here, the self-supporting geometry of internal channel 40, defined by peripheral wall 42, again constitutes a rounded profile for top portion 43 of internal channel 40 but a linear, rectangular geometry for bottom 45 and sides 47 of internal channel 40.

Figure 4C:
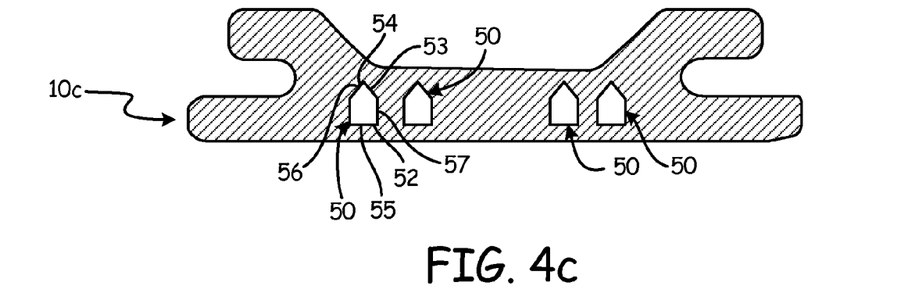

Referring now to FIG. 4c, a cross-sectional view of BOAS 10c is shown. Internal channel 50 with peripheral wall 52 is a microchannel of eccentric convexity geometry at top portion 53. Peripheral wall 52, and thus internal channel 50, is of a self-supporting, eccentric convexity geometry as peripheral wall 52 at location 54 is buttressed by peripheral wall 52 at location 56. The self-supporting geometry of internal channel 50, defined by peripheral wall 52, constitutes a squeezed profile for top portion 53 of internal channel 50 but a linear, rectangular geometry for bottom 55 and sides 57. A squeezed profile refers to a profile that is generally triangular in shape, with a surface profile generally following triangle 108 circumscribed by arch 100 shown in FIG. 3.

Figure 4D:
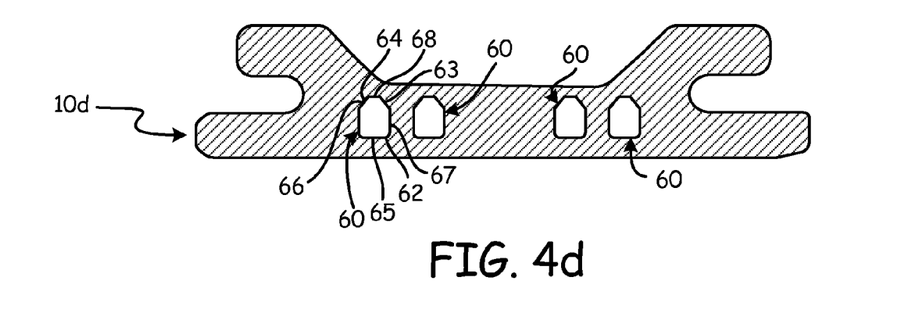

Moving to FIG. 4d, a cross-sectional view of BOAS 10d is shown. Internal channel 60 with peripheral wall 62 is a microchannel of eccentric convexity geometry at top portion 63. Peripheral wall 62, and thus internal channel 60, is of a self-supporting, eccentric convexity geometry as peripheral wall 62 at location 64 is buttressed by peripheral wall 62 at location 66. The self-supporting geometry of internal channel 60, defined by peripheral wall 62, constitutes a squeezed profile for top 63 of internal channel 60 but a linear, rectangular geometry for bottom 65 and sides 67. The flat portion 68 at top 63 of internal channel 60 is supported by the eccentric convexity geometry and thus is prevented from collapsing when loads are applied normal to the surface of internal channel 60—when additional layers are built on top of flat portion 68.

Figure 5A:
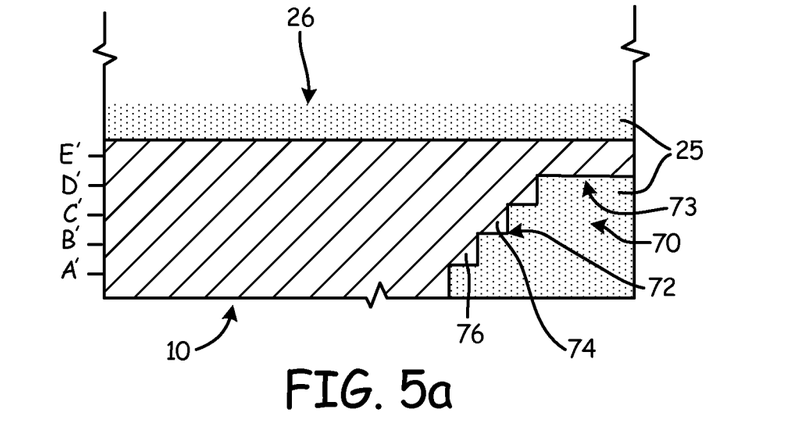
FIGS. 5a-5c illustrate an additive manufacturing method for producing the turbine blade outer air seal of FIG. 1 with normal cooling channels containing a controlled sag.
Figure 5B:
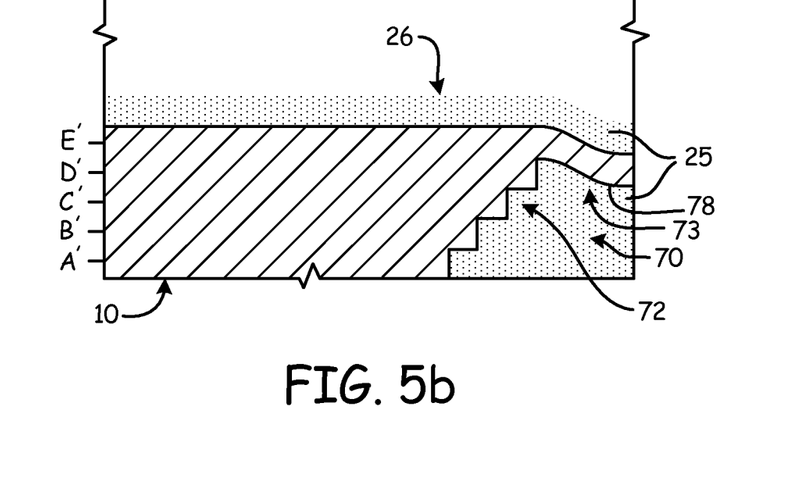
Figure 5C:
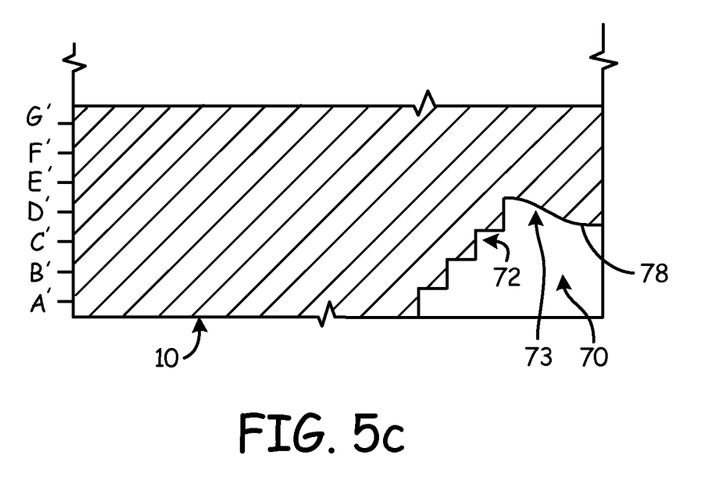

FIGS. 5a-5c illustrate an additive manufacturing method for producing the turbine blade outer air seal of FIG. 1 with normal cooling channels containing a controlled sag. As previously noted, a microchannel generally has a largest cross-sectional area of approximately 0.0025 in.$^2$ (1.6129 mm$^2$), with a widest cross-sectional radial width under approximately 0.080 in. (2.032 mm) When a channel is larger than this, it is referred to as a normal cooling channel instead of a microchannel.

FIG. 5a shows a close-up side elevational view of a portion of BOAS 10 being additively built. Powders 25 is powder bed 26 are fused to build BOAS 10 on a layer-by-layer basis. Also shown are internal channel 70 with peripheral wall 72, top portion 73 of internal channel 70 and layers A', B', C', D', and overhanging layer E'. Again, layer thickness ranges from approximately 0.001-0.005 inch (0.025-0.127 millimeter) and powder size ranges from approximately 0.0016-0.0047 inch (0.04-0.12 millimeter).

The manner in which layers A'-E' are built is the same as that described for FIG. 2c. Specifically, internal channel 70 is built to have eccentric convexity geometry at top portion 73 such that each subsequently built layer is buttressed by the immediately preceding layer without the use of any support material. For instance, subsequent layer C' has an overhang 74 which is buttressed by immediately preceding layer B' at location 76. This allows peripheral wall 72, and thus internal channel 70, to be self-supporting and prevents overhanging layer E' from collapsing when additional layers are built on top of layer E'.

In FIG. 5b, the same close-up side elevational view of a portion of BOAS 10 shown in FIG. 5a is again shown. However, here top portion 73 contains a controlled sag in overhanging layer E' at location 78. The controlled sag at location 78 occurs while powders 25 are still present in internal channel 70, as powders 25 contain voids which allow powders 25 to be compressed. Controlled sag at location 78 occurs as a result of the tolerance ratio used in forming internal channel 70, such that the lower the tolerance, the less the magnitude of the sag at 78. The normal tolerance used in the methods described herein is approximately 10-15%. This allows for a better yield when additively manufacturing BOAS 10, with the resulting sag at 78 controlled to be small enough such that it does not significantly impede the cooling flow. Additionally, the depth, or height $h_s$ shown in FIG. 6, of sag 78 is also controlled by the buttressing provided by peripheral wall 72. When sag 78 deflects downward, the buttressing in peripheral wall 72 compresses and as a result produces a normal force countering sag 78.

Controlled sags are not utilized in microchannels (discussed in FIGS. 1-4d) because microchannels are of small sizes where controlled sags would detrimentally affect the cooling efficiencies of the microchannels. Although sag at 78 occurs, peripheral wall 72, and thus internal channel 70, does not collapse because it is self-supporting as a result of the buttressing provided by the eccentric convexity geometry at top portion 73.

FIG. 5c shows the same close-up side elevational view of a portion of BOAS 10 as was shown in FIG. 5b. However, as shown here additional layers F' and G' have been built on top of overhanging layer E' and the additive build has been completed resulting in powders 25 being removed from internal channel 70 and BOAS 10 no longer present in powder bed 26. Although powders 25 have been removed from internal channel 70, internal channel 70 does not collapse because powders 25 serve no support function. Rather, internal channel 70 is supported by the eccentric convexity geometry at top portion 73 which provides the previously described buttressing that allows peripheral wall 72, and thus internal channel 70, to be self-supporting. Sag at 78 is still present in layer E' and constitutes part of the configuration of internal channel 70. Consequently, by controlling sag at 78 by the tolerance on dimension used, the yield when additively building BOAS 10 can be significantly increased without detrimentally affecting the cooling flow.

Figure 6:
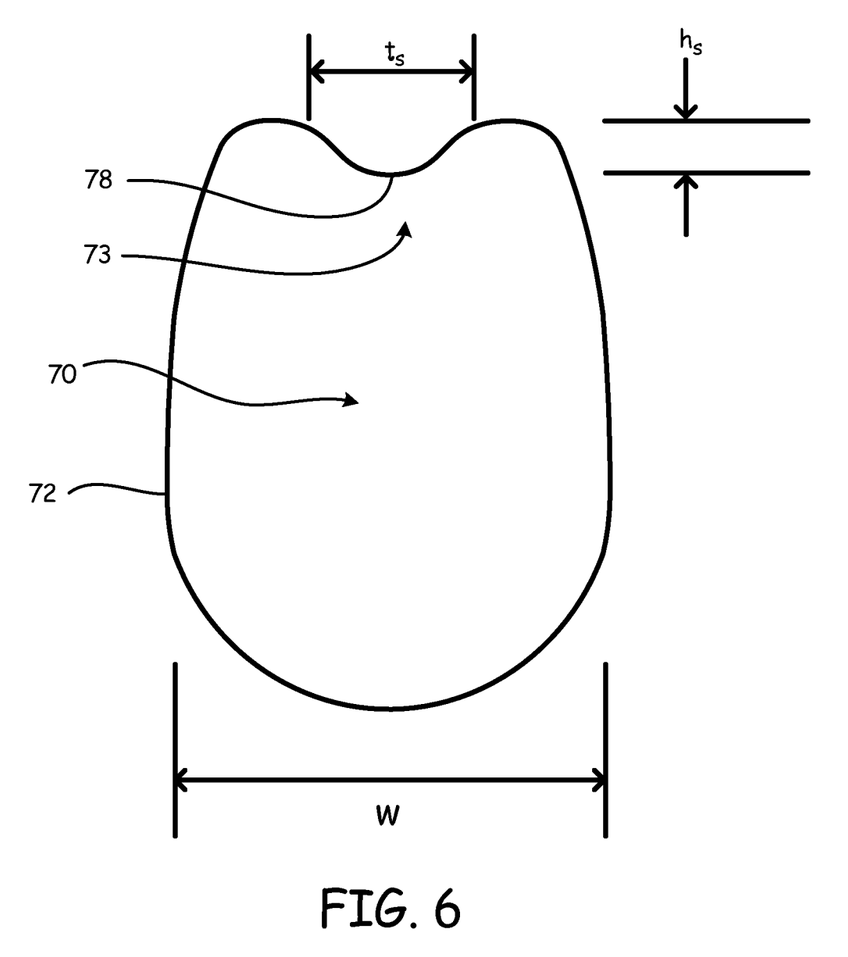
FIG. 6 shows dimensions of a normal cooling channel containing a controlled sag.

FIG. 6 illustrates dimensions of internal channel 70, a normal cooling channel, with peripheral wall 72 at top portion 73 containing controlled sag 78. Also shown are internal channel 70 width w, sag 78 thickness $t_s$, and sag 78 height $h_s$. Sag 78 is sized such that the cross-sectional area of sag 78, or thickness $t_s$*height $h_s$, is between 1-5% of the area of a circle circumscribing internal channel 70—$0.01*(¼)*\pi*(w)^2 < (t_s*h_s) < 0.05*(¼)*\pi*(w)^2$. Sag 78 sized in accordance with this range, will not be too large to detrimentally affect the cooling flow through internal channel 70 and will be buttressed by the eccentric convexity in top portion 73 and thus prevented from collapsing when additional layers are built on top of internal channel 70.

Figure 7A:
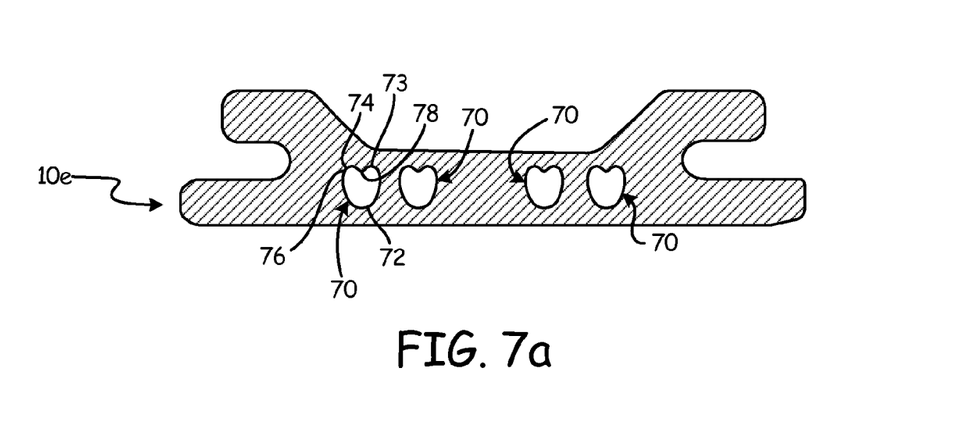
FIGS. 7a-7c show cross-sectional views of alternative embodiments of the turbine blade outer air seal of FIG. 1 with different normal cooling channel configurations.
Figure 7B:
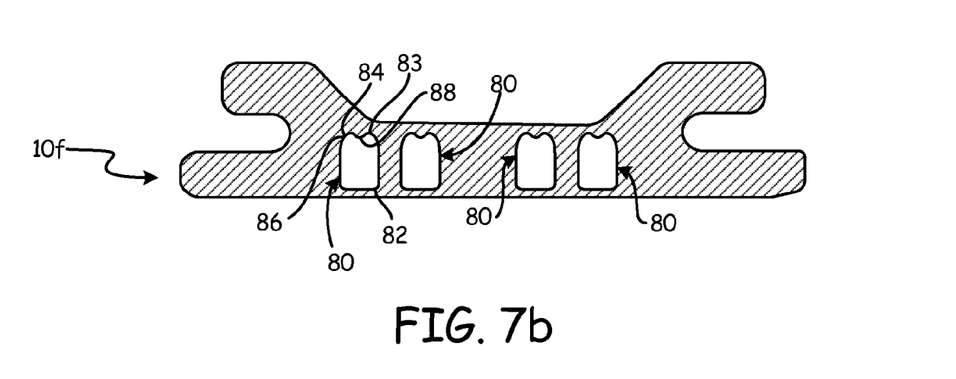
Figure 7C:
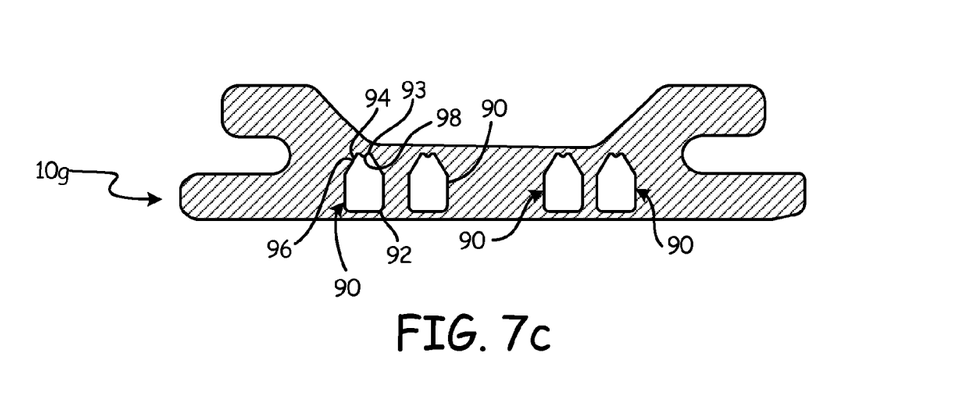

FIGS. 7a-7c show cross-sectional views of alternative embodiments of BOAS 10 of FIG. 1 with different normal cooling channel configurations. FIG. 7a shows a cross-sectional view of BOAS 10e. Internal channel 70 with peripheral wall 72 is a normal cooling flow channel. Internal channel 70 is built to have eccentric convexity at top portion 73 so that peripheral wall 72, and thus internal channel 70, is self-supporting and does not collapse when additional layers are built on top of top portion 73 of internal channel 70. Specifically, in the same manner as detailed previously, peripheral wall 72 is kept from collapsing due to the continual buttressing of layers. For example, peripheral wall 72 at location 74 is buttressed by peripheral wall 72 at location 76. As detailed for FIGS. 5a-5c, internal channel 70 at top portion 73 contains controlled sag at location 78.

Referring to FIG. 7b, a cross-sectional view of BOAS 10f is shown. Internal channel 80 with peripheral wall 82 is a normal cooling flow channel. Internal channel 80 is built to have eccentric convexity geometry at top portion 83 so that peripheral wall 82, and thus internal channel 80, is self-supporting and does not collapse when additional layers are built on top of top portion 83 of internal channel 80. Particularly, in the same manner as detailed previously, peripheral wall 82 is kept from collapsing due to the continual buttressing of layers. For instance, peripheral wall 82 at location 84 is buttressed by peripheral wall 82 at location 86. Internal channel 80 at top portion 83 contains controlled sag at location 88, which occurs in the same manner as that detailed for FIGS. 5a-5c.

FIG. 7c shows a cross-sectional view of BOAS 10g. Internal channel 90 with peripheral wall 92 is a normal cooling flow channel. Top portion 93 of internal channel 90 contains a squeezed, or triangular, profile. Internal channel 90 is built to have eccentric convexity geometry at top portion 93 so that peripheral wall 92, and therefore internal channel 90, is self-supporting and does not collapse when additional layers are built on top of top portion 93 of internal channel 90. Specifically, in the same manner as detailed previously, peripheral wall 92 is kept from collapsing due to the continual buttressing of layers. For example, peripheral wall 92 at location 94 is buttressed by peripheral wall 92 at location 96. Internal channel 90 at top portion 93 contains controlled sag at location 98, which occurs in the same manner as that detailed for FIGS. 5a-5c.

Although the internal channel geometries shown in each BOAS 10 are of uniform geometry, it is also possible to form internal channels in the same actively cooled component of various self-supporting geometries. For example, a component could contain an internal channel of a geometry shown in FIG. 1 and another internal channel of a geometry shown in FIG. 4b. Furthermore, a component could contain an internal channel that is a microchannel, such as internal channel 60 of FIG. 4d, and contain another internal channel that is a normal cooling flow channel, such as internal channel 90 of FIG. 7c.

The ability to additively construct internal channels to be self-supporting does away with the need to use support material (for example, loosely fused powder) inside the internal channel to build overhanging channel portions. As a result, support material will not become trapped inside microchannels, which because of their small size generally have no access for cleaning the support material out after the build and are rendered useless as cooling channels when support material is trapped inside. Consequently, cooling channels can operate at their intended efficiency levels yet high-volume additive production can be achieved because both previously necessary additional internal channel support material is eliminated and post-processing costs are minimized. All the while, more effective, smaller volume internal cooling channels can be utilized.

DISCUSSION OF POSSIBLE EMBODIMENTS

The following are non-exclusive descriptions of possible embodiments of the present invention.

A method of additively manufacturing a component with an internal cooling channel for conveying a fluid, the method comprising selectively fusing powders in a powder bed to form a shaped layer of a body of the component. The fusing is repeated to form the body of the component with the internal cooling channel extending within the body, so that a peripheral wall of the internal cooling channel has geometry that allows the peripheral wall to be self-supporting.

The method of the preceding paragraph can optionally include, additionally and/or alternatively, the following techniques, steps, features and/or configurations:

The peripheral wall at a portion of the internal cooling channel formed by each subsequent layer is buttressed by the peripheral wall of the internal cooling channel formed by an immediately preceding layer such that the internal cooling channel is self-supporting.

The buttressing provided by the peripheral wall is formed to be of a rate that is a function of the maximum width of a bottom portion of the internal cooling channel.

A top portion of the peripheral wall of the internal cooling channel includes a controlled sag, wherein the controlled sag is at least partially controlled by the buttressing of the peripheral wall of the internal cooling channel.

The internal cooling channel is a microchannel.

At least part of the peripheral wall of the portion of the internal cooling channel comprises a rounded profile.

At least part of the peripheral wall of the portion of the internal cooling channel comprises a squeezed profile.

The component is additively manufactured to contain the internal cooling channel without the use of support material.

The component comprises an actively cooled gas turbine engine component.

A method to additively manufacture a component that utilizes a mirochannel within the component to convey a fluid internally, the method comprising selectively fusing powders in a powder bed to form an initial shaped layer of a body of the component; and repeating the fusing to form the body of the component with the microchannel extending within the body. The microchannel includes an eccentric convexity geometry such that the microchannel can self-support subsequent layers fused on top of the microchannel.

The method of the preceding paragraph can optionally include, additionally and/or alternatively, the following techniques, steps, features and/or configurations:

The eccentric convexity geometry causes a microchannel peripheral wall formed by a subsequent layer to be buttressed by the microchannel peripheral wall formed by a previous layer.

The microchannel has a cross-sectional area of approximately 0.0025 in.$^2$ (1.6129 mm$^2$) or less.

The eccentric convexity geometry at a portion of a microchannel peripheral wall comprises a rounded profile for the portion.

The eccentric convexity geometry at a portion of a microchannel peripheral wall comprises a squeezed profile for the portion.

The component is additively manufactured to contain the microchannel without the use of support material.

The component comprises an actively cooled gas turbine engine component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of additively manufacturing a component with an internal cooling channel for conveying a fluid, the method comprising:
   selectively fusing powders in a powder bed to form a shaped layer of a body of the component; and
   repeating the fusing on a layer-by-layer basis to form the body of the component with the internal cooling channel extending within the body, wherein at a location within the component where the internal cooling channel is to be located the fusing is done in a manner that forms a peripheral wall of the internal cooling channel having a geometry in which each subsequent layer is buttressed by the peripheral wall of the internal cooling channel formed by an immediately preceding layer such that the internal cooling channel is self-supporting with the buttressing provided by the peripheral wall formed to be of a rate that is a function of a width of a bottom portion of the internal cooling channel.

2. The method of claim 1, wherein a top portion of the peripheral wall of the internal cooling channel includes a controlled sag, and wherein the controlled sag is at least partially controlled by the buttressing of the peripheral wall of the internal cooling channel.

3. The method of claim 1, wherein the internal cooling channel is a microchannel.

4. The method of claim 1, wherein at least part of the peripheral wall of the portion of the internal cooling channel comprises a rounded profile.

5. The method of claim 1, wherein at least part of the peripheral wall of the portion of the internal cooling channel comprises a squeezed profile.

6. The method of claim 1, wherein the component is additively manufactured to contain the internal cooling channel without the use of support material inside the internal cooling channel.

7. The method of claim 1, wherein the component comprises an actively cooled gas turbine engine component.

8. The method of claim 1, wherein the buttressing provided by the peripheral wall forms an arch of the internal cooling channel that the radius of the arch is between one-fourth and three-fourths the width of the bottom portion of the internal cooling channel.

9. A method to additively manufacture a component that utilizes a microchannel within the component to convey a fluid internally, the method comprising:
   selectively fusing powders in a powder bed to form an initial shaped layer of a body of the component; and
   repeating the fusing on a layer-by-layer basis to form the body of the component with the microchannel extending within the body, wherein the microchannel includes an eccentric convexity geometry such that the microchannel can self-support subsequent layers fused on top of the microchannel with a subsequent layer extending into the microchannel further than a previous layer to form a buttress with a length of the buttress determined by a rate that is a function of a width of a bottom portion of the microchannel.

10. The method of claim 9, wherein the microchannel has a cross-sectional area of approximately 0.0025 in.$^2$ (1.6129 mm$^2$) or less.

11. The method of claim 9, wherein the eccentric convexity geometry at a portion of a microchannel peripheral wall comprises a rounded profile for the portion.

12. The method of claim 9, wherein the eccentric convexity geometry at a portion of a microchannel peripheral wall comprises a squeezed profile for the portion.

13. The method of claim 9, wherein the component is additively manufactured to contain the microchannel without the use of support material inside the microchannel.

14. The method of claim 9, wherein the component comprises an actively cooled gas turbine engine component.

15. The method of claim 9, wherein the buttresses form an arch in a top portion of the microchannel that has a radius between one-fourth and three-fourths the width of the bottom portion of the microchannel.

* * * * *